June 8, 1937.  J. B. BAMBENEK  2,082,937
EMERGENCY CHAIN UNIT
Filed April 18, 1936  3 Sheets-Sheet 2

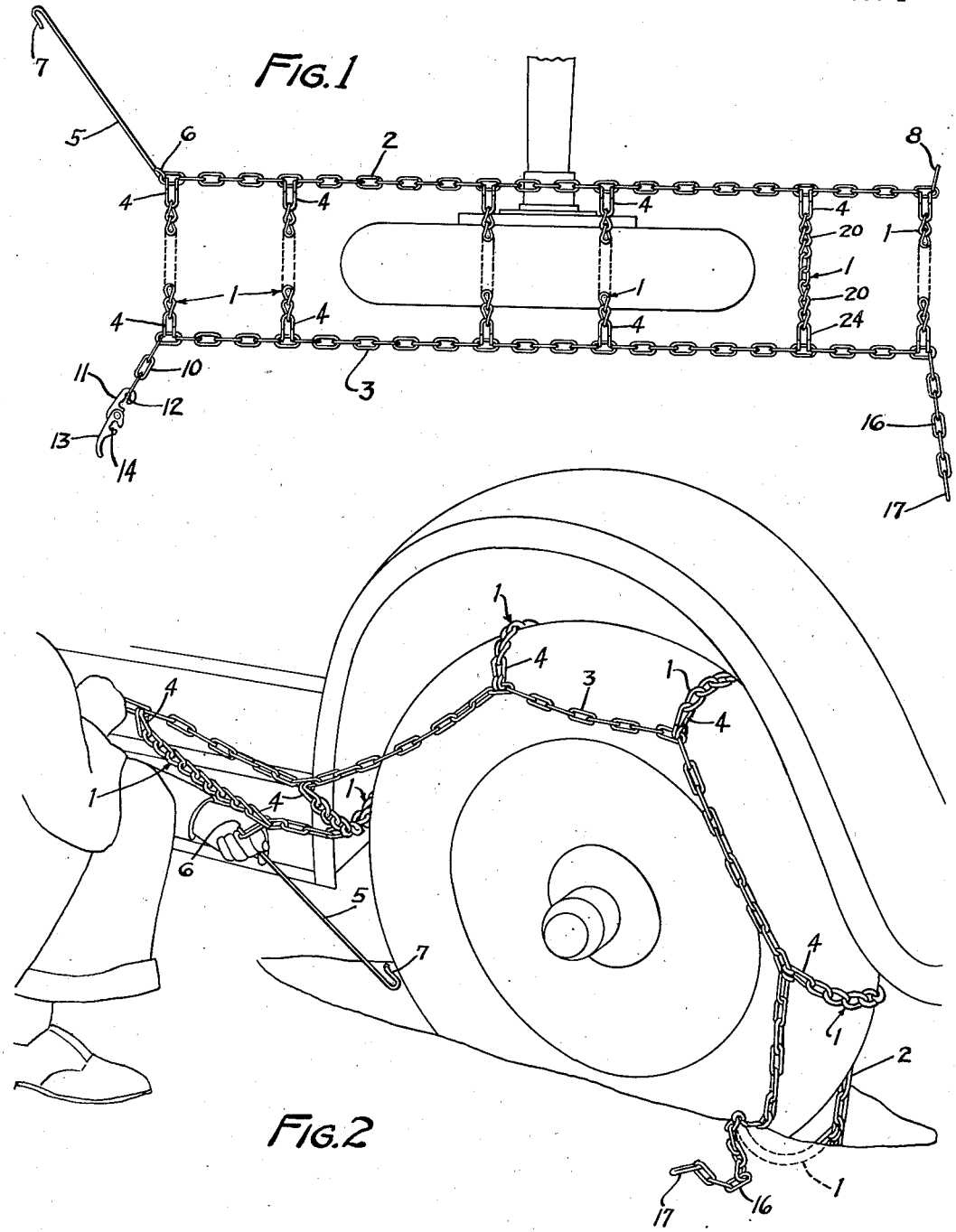

Inventor
JOSEPH B. BAMBENEK
By Paul, Paul & Moore
ATTORNEYS

June 8, 1937. J. B. BAMBENEK 2,082,937
EMERGENCY CHAIN UNIT
Filed April 18, 1936 3 Sheets-Sheet 3

Inventor
JOSEPH B. BAMBENEK
By Paul, Paul Moore
ATTORNEYS

Patented June 8, 1937

2,082,937

UNITED STATES PATENT OFFICE 2,082,937

EMERGENCY CHAIN UNIT

Joseph B. Bambenek, Winona, Minn., assignor to Peerless Chain Company, Winona, Minn., a corporation of Minnesota Application April 18, 1936, Serial No. 75,143

6 Claims. (Cl. 152—14)

This invention relates to emergency chains for automobile tires and has as an important object to provide a unit or device which can be applied to spokeless wheels or to wheels of the armored or plate type.

Another object is to provide a unit which can be applied to a wheel when a substantial portion of it is embedded in mud, and also to provide a device which can be easily applied to the later models of automobiles in which the mud guards overlap a large area of the outside of the wheel. The device is easily applied to the large wheels of vans or trucks.

An important feature of the invention relates to means facilitating application of the device to the wheel, including a rod applied at the inside of the wheel, and connectable with another part which is in full view at the periphery of the wheel.

Another feature of the invention is the provision of means at the outer side of the wheel which is detachably connected with another part of the unit to complete the securing of the unit. Another feature is the arrangement of the rod and the last mentioned element in opposition at opposite sides of the wheel.

Features of the invention include all details of construction, along with the broader ideas of means inherent in the disclosure.

Objects, features and advantages of the invention will be set forth in the description of the drawings forming a part of this application, and in said drawings—

Figure 1 is a plan view of the unit with all the elements in one plane and with the unit arranged above a wheel as at the beginning of application;

Figure 2 is a perspective view illustrating the preliminary operation of introduction of the rod at one periphery of the wheel to move across the inside of the wheel, for connection with a part located near the opposite periphery;

Figure 3:
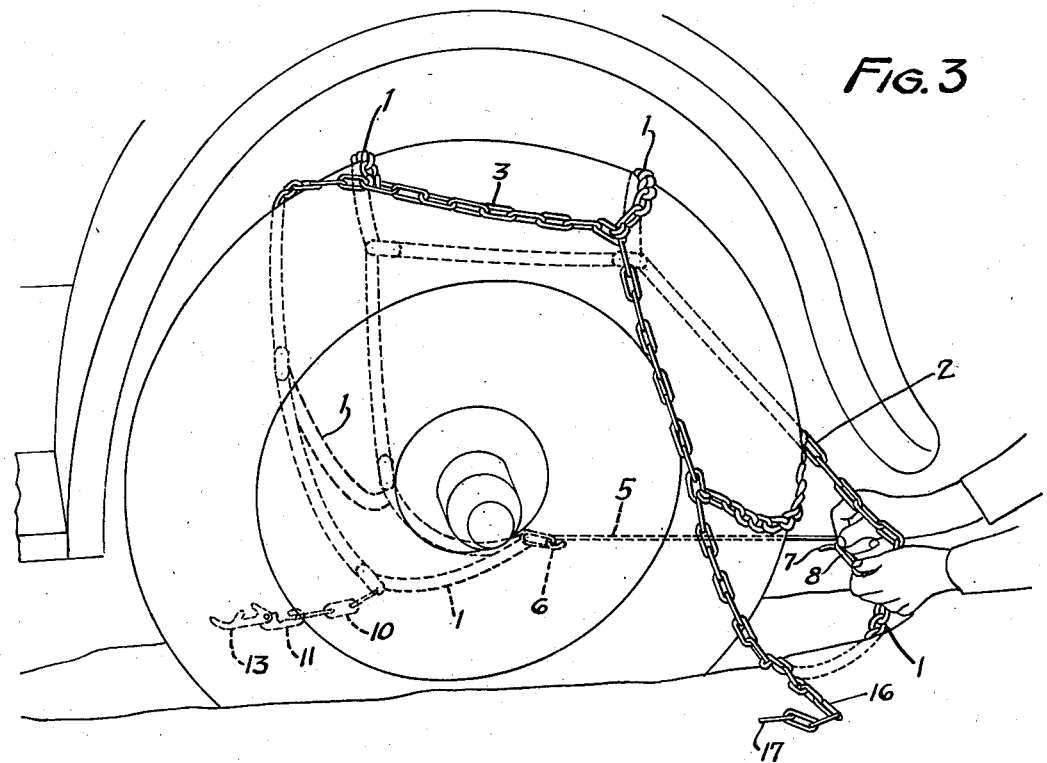
Figure 3 is a perspective view showing how the rod, after passage across the inner side of the wheel, is connected with another part of the unit, which part is in full view, or can be brought to full view to facilitate such connection.

Referring first to Figure 1: The unit is shown as comprising six traction elements, in this instance cross chains indicated at 1. Each chain has at each end one of two circumferentially laterally placed retaining devices 2, 3 comprising chain lengths or other suitable flexible elements adapted respectively to lie at the inner and outer side of the wheel, to hold and secure the cross chains in spaced relation. Each element 2, 3 can be considered to be continuous length or to be composed of a series of short lengths. At one end of length 2 is arranged a stiff rod 5 hinged to terminal link of the length 2 by an eye 6 and having at the opposite end a hook 7. This hook is adapted to couple with a link 8, arranged at the opposite terminal of the chain length 2, and adapted to be brought to a clearly visible position adjacent the periphery of the tire to facilitate coupling with the rod.

Figure 4:
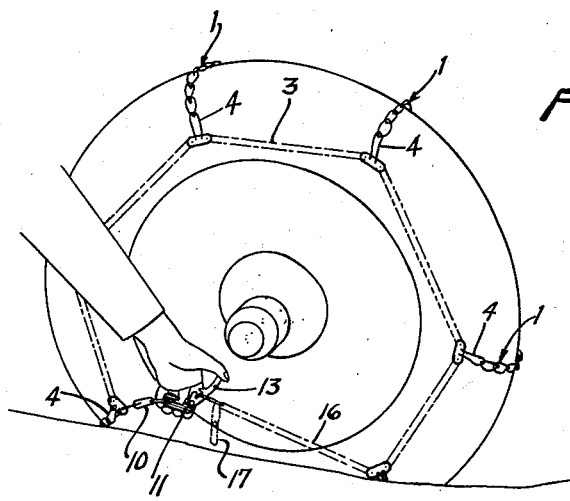
Figure 4 shows the final step in attaching operation, including slack take-up.

At one end of the chain length 3 and extending beyond the terminal cross chain for that end, are a few links of chain indicated at 10 and to the outer end of this length 10 is attached a quickly releasable take-up and securing device including a plate 11 having a locking notch 12 at one end, and having a lock lever 13 at the opposite end having a link pocket 14, adapted to receive link 17 at the end of a chain section 16 as an extension of chain 3, beyond the cross chain at that end. The device is operated in the manner shown in Figure 4 to finally secure the device on the tire and to take up slack in so doing.

Although six cross chains have been shown, it will, of course, be understood that a greater or lesser number can be used. The peripheral positions of the cross chains, in this instance, are related substantially as the apices of an equilateral triangle. The cross chains 1 are in this instance of the twisted link type and each chain includes connecting links 4, a few twisted links indicated at 20. The side chains are in this instance composed of the ordinary plain untwisted links, as are also the link 8 and link sections 10 and 16.

I have used the expression "side chains" to describe the ensemble of chain link sections 2, 3, 8, 10 and 16, but, of course, there is no intention to be entirely limited to the exact manner of connecting these side chains to the cross chains, since any suitable connection which will properly hold the cross chain can be used. I do claim constructional details of the unit, but the invention is, of course, not entirely limited to such details. The important feature is the use of a single element of the proper stiffness and of sufficient length to be inserted from one side of the periphery, to extend across the inside of the wheel, and be accessible at the opposite side for clear vision connection with link 8 or its equivalent.

The rod may be detachable at both ends instead of being permanently hinged as at 6, and it is possible that the rod may be detached at the time of delivery to the user. The character of the hook may be changed or other fastening device may be substituted. The gist of the invention is the use of a rod or element of sufficient stiffness and length to be passed across to the inner side of the wheel, and connected to the link 8 in the manner shown in Figure 3. This rod may be likened to a needle which is held in one hand and thrust across the inner side of the wheel to be secured in the manner set forth.

Figure 5:
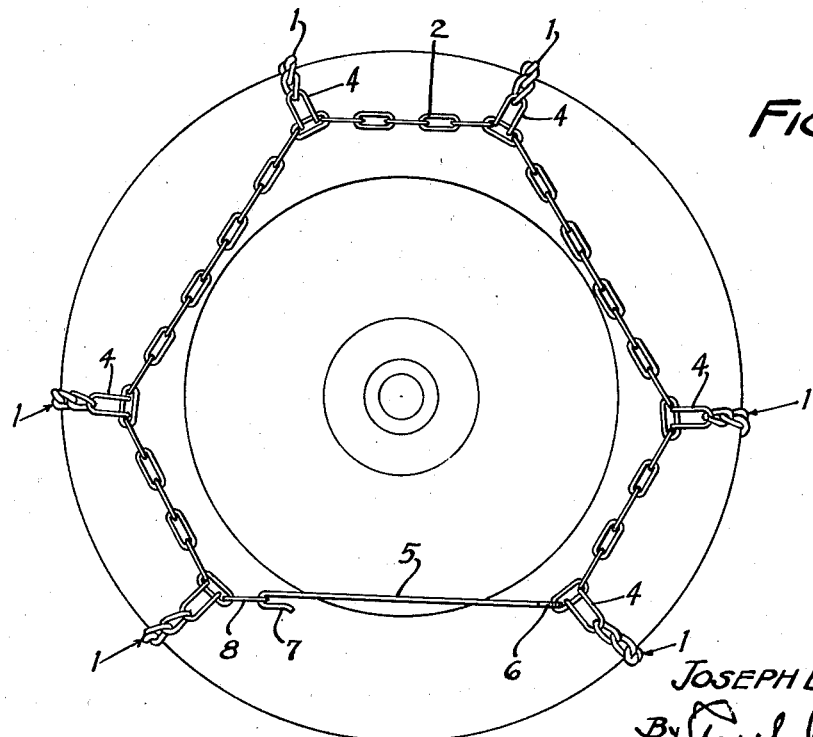
Figure 5 is a view from the inner side of the wheel with the device attached.
Figure 6:
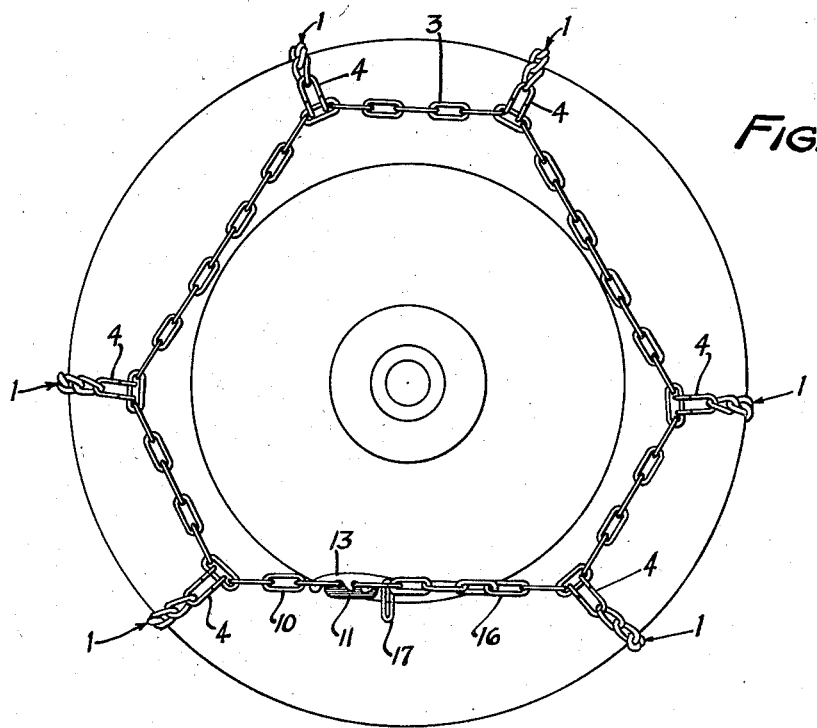
Figure 6 is a similar view of the outside of the wheel.

By comparison of Figures 5 and 6, it is noted that the rod and the chain sections 10 and 16 lie in opposition to one another at opposite sides of the wheel, and that the unit is so applied that these elements lie substantially horizontally near the lower portion of the wheel, and are related to the side of the wheel as chords to their arc. Of course, this is not absolutely necessary but it is a more desirable scheme because these elements 5, 10 and 16 both then lie substantially parallel with and near the ground and the attaching devices can therefore be more easily manipulated. When only three cross chains are used, the elements 5, 10, 11, 16, etc., will be spaced a greater distance upwardly from the ground level. It will be noted, see Figure 6, that slack may be taken up by connecting the lever with the proper link, sometimes leaving the end link 17, and possibly other of the links of the chain section 16, free or hanging. In this manner, slack can be to some extent taken up for different sizes of tires.

For quick, convenient application of the unit, under the most adverse conditions, the use of a single rod or equivalent, of sufficient length and functioning as set forth, is the most valuable feature of this invention and this scheme is broadly claimed.

I claim as my invention:

1. An emergency unit for vehicle wheels having traction cross members and means disposed respectively at inner and outer sides of the wheel to hold the cross members in place, comprising a single rod attached at one end terminally of the inner of said means, said rod being of sufficient length so that it may be passed from one periphery of the wheel across the inner side of the wheel to have its outer end visibly positioned at the opposite periphery to be detachably connected with said inner means and when so connected to be related to the wheel as a chord to its arc.

2. An emergency unit having traction cross chains, and two flexible elements for connecting and securing the cross chains in spaced relation around the periphery of the tire, one element for the outer side of the wheel and one element for the inner side of the wheel, one portion only of the inner element comprising a rod of sufficient length so that it may be passed from one periphery of the wheel across the inner side of the wheel to have its outer end visibly positioned at the opposite periphery of the wheel and detachably connected with another part of the unit, and means for detachably connecting the ends of the outer flexible element.

3. An emergency unit for vehicle wheels having traction cross members and two flexible elements for connecting and securing the cross members in spaced relation around the periphery of the wheel, one element for the outer side of the wheel and the other element for the inner side of the wheel, the inner of said elements having a rod connected thereto of sufficient length so that it may be passed from one periphery of the wheel across the inner side of the wheel to have its outer end visibly positioned at the opposite periphery of the wheel, means for connecting the outer end of said rod to the opposite end of said inner flexible element, and means for connecting the ends of the flexible element on the outer side of the wheel.

4. An emergency unit for vehicle wheels having traction cross members and two flexible elements for connecting and securing the cross members in spaced relation around the periphery of the wheel, one element for the outer side of the wheel and the other element for the inner side of the wheel, the inner of said elements having a relatively straight rod connected to an end of said element, said rod being of sufficient length so that it may be passed from one periphery of the wheel across the inner side of the wheel to have its outer end visibly positioned at the opposite periphery of the wheel, said rod having a hook adapted to engage to an eye formed on the opposite end of said inner flexible element, and means for detachably connecting the ends of said outer flexible element.

5. In a device of the class described, two longitudinal strands, traction increasing elements cross-connecting said strands, two of said cross elements respectively being at and connecting respective terminals of said strands, a rod swingingly connected at one end to one terminal of one of said strands and having fastening means at the opposite free end thereof, said rod being of sufficient length so that it may be passed from one periphery of the wheel across the inner side of the wheel to have its outer end visibly positioned at the opposite periphery of the wheel, a relatively short connecting means at the opposite end of said strand, the fastening means on said rod being adapted to connect with said relatively short connecting means, a slack take-up means connected to the other strand at an end thereof, and a terminal extension on the other end of the last mentioned strand adapted to be detachably connected to said slack take-up means.

6. In a device of the class described, two longitudinal strands, traction increasing elements cross-connecting said strands, two of said cross elements respectively being at and connecting respective terminals of said strands, a rod swingingly connected at one end to one terminal of one of said strands and having a hook at the opposite free end thereof, said rod being of sufficient length so that it may be passed from one periphery of the wheel across the inner side of the wheel to have its outer end visibly positioned at the opposite periphery of the wheel, a relatively short connecting means at the opposite end of said strand, said hook on said rod being adapted to connect with said relatively short connecting means, a slack take-up means connected to the other strand at an end thereof, and a terminal extension on the other end of the last mentioned strand adapted to be detachably connected to said slack take-up means.

JOSEPH B. BAMBENEK.